(12) United States Patent
Ye et al.

(10) Patent No.: US 12,041,583 B2
(45) Date of Patent: Jul. 16, 2024

(54) SLOT AGGREGATION AND SELECTIVE PRIORITIZATION FOR PHYSICAL SIDELINK FEEDBACK CHANNEL COMMUNICATIONS

(71) Applicant: Apple Inc., Cupertino, CA (US)

(72) Inventors: Chunxuan Ye, San Diego, CA (US); Chunhai Yao, Beijing (CN); Dawei Zhang, Saratoga, CA (US); Haijing Hu, Beijing (CN); Haitong Sun, Irvine, CA (US); Hong He, Cupertino, CA (US); Oghenekome Oteri, San Diego, CA (US); Sigen Ye, Whitehouse Station, NJ (US); Wei Zeng, San Diego, CA (US); Weidong Yang, San Diego, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 296 days.

(21) Appl. No.: 17/437,125

(22) PCT Filed: Aug. 5, 2020

(86) PCT No.: PCT/CN2020/107196
§ 371 (c)(1),
(2) Date: Sep. 8, 2021

(87) PCT Pub. No.: WO2022/027354
PCT Pub. Date: Feb. 10, 2022

(65) Prior Publication Data
US 2022/0312384 A1    Sep. 29, 2022

(51) Int. Cl.
H04W 72/02    (2009.01)
H04L 5/00    (2006.01)
(Continued)

(52) U.S. Cl.
CPC .......... *H04W 72/02* (2013.01); *H04L 5/0053* (2013.01); *H04W 72/0446* (2013.01);
(Continued)

(58) Field of Classification Search
CPC ..... H04W 72/02; H04W 72/56; H04W 72/20; H04W 72/0446; H04W 72/1263; H04L 5/0053
See application file for complete search history.

(56) References Cited

U.S. PATENT DOCUMENTS

2006/0164993 A1    7/2006    Teague et al.
2009/0075599 A1    3/2009    Baker et al.
(Continued)

FOREIGN PATENT DOCUMENTS

CN    107534459 A    1/2018
WO    2020146649 A1    7/2020

OTHER PUBLICATIONS

Extended European Search Report for EP Patent Application No. 20948891.5; dated Aug. 3, 2023.
(Continued)

*Primary Examiner* — Justin Y Lee
(74) *Attorney, Agent, or Firm* — Kowert, Hood, Munyon, Rankin & Goetzel, P.C.

(57) ABSTRACT

Embodiments are presented herein of apparatuses, systems, baseband processors, and methods for performing vehicle-to-everything sidelink communication. A wireless device receives first control information through a sidelink control channel specifying one or more first time slots for the wireless device to transmit a first acknowledgment message over a sidelink feedback channel. The wireless device transmits second control information through the sidelink control channel specifying one or more second time slots for the wireless device to receive a second acknowledgment mes-
(Continued)

sage over the sidelink feedback channel. The first and second time slots at least partially overlap, and it is determined whether the first data packet or the second data packet has a higher priority. The acknowledgment message associated with the higher priority data packet is transmitted or received during at least a subset of the overlapping time slots.

20 Claims, 11 Drawing Sheets

(51) Int. Cl.
  *H04W 72/0446* (2023.01)
  *H04W 72/1263* (2023.01)
  *H04W 72/20* (2023.01)
  *H04W 72/56* (2023.01)

(52) U.S. Cl.
  CPC ....... *H04W 72/1263* (2013.01); *H04W 72/20* (2023.01); *H04W 72/56* (2023.01)

(56) References Cited

U.S. PATENT DOCUMENTS

2018/0351707 A1  12/2018  Wang et al.
2020/0205166 A1  6/2020  Huang

OTHER PUBLICATIONS

Samsung "On Physical Layer Procedures for NR V2X"; 3GPP TSG RAN WG1 #99 R1-1912464; Nov. 18, 2019.
Vivo "Discussion on potential techniques for coverage enhancements"; 3GPP TSG RAN WG1 #101 R1-2003437; May 25, 2020.
Apple "NR V2X Sidelink Physical Layer Procedures"; 3GPP TSG RAN WG1 #98bis R1-1910964; Oct. 14, 2019.
International Search Report for PCT Patent Application No. PCT/CN2020/107196; dated Apr. 25, 2021.

SLOT AGGREGATION AND SELECTIVE PRIORITIZATION FOR PHYSICAL SIDELINK FEEDBACK CHANNEL COMMUNICATIONS

PRIORITY CLAIM INFORMATION

This application is a national stage application of International Application No. PCT/CN2020/107196, filed on Aug. 5, 2020, titled "Slot Aggregation and Selective Prioritization for Physical Sidelink Feedback Channel Communications", which is hereby incorporated by reference in its entirety.

FIELD

The present application relates to wireless devices, and more particularly to apparatuses, systems, and methods for wireless devices to perform selective prioritization of sidelink communication in vehicle-to-everything (V2X) wireless cellular communications.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), and other wireless communications devices for various purposes, such as to coordinate traffic activity, facilitate autonomous driving, and perform collision avoidance.

V2X communication has the potential to be a source of increasing demand and range of envisioned uses of wireless communication, which may present a variety of design and development challenges. Accordingly, improvements in the field in support of such development and design are desired.

SUMMARY

Embodiments are presented herein of apparatuses, systems, and methods for performing vehicle-to-everything (V2X) sidelink wireless cellular communications. In some embodiments, a baseband processor is configured to perform operations, as described herein. For example, the baseband processor may be installed within the described wireless device.

In some embodiments, a wireless device receives first control information through a sidelink control channel specifying one or more first time slots for the wireless device to transmit a first acknowledgment message over a sidelink feedback channel. The first acknowledgment message provides acknowledgment for a first data packet received by the wireless device.

In some embodiments, the wireless device transmits second control information through the sidelink control channel specifying one or more second time slots for the wireless device to receive a second acknowledgment message over the sidelink feedback channel. The second acknowledgment message provides acknowledgment for a second data packet transmitted by the wireless device.

In some embodiments, it is determined that one or more of the first time slots coincide with one or more of the second time slots. It is then determined whether the first data packet or the second data packet has a higher priority.

Based a determination that the first data packet has the higher priority, the first acknowledgment message is transmitted during a first subset of the first time slots that coincide with one or more of the second time slots, and the second acknowledgment message is not received during the first subset of the first time slots.

Alternatively, based on a determination that the second data packet has the higher priority, the second acknowledgment message is received during the first subset of the first time slots, and the first acknowledgment message is not transmitted during the first subset of the first time slots.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
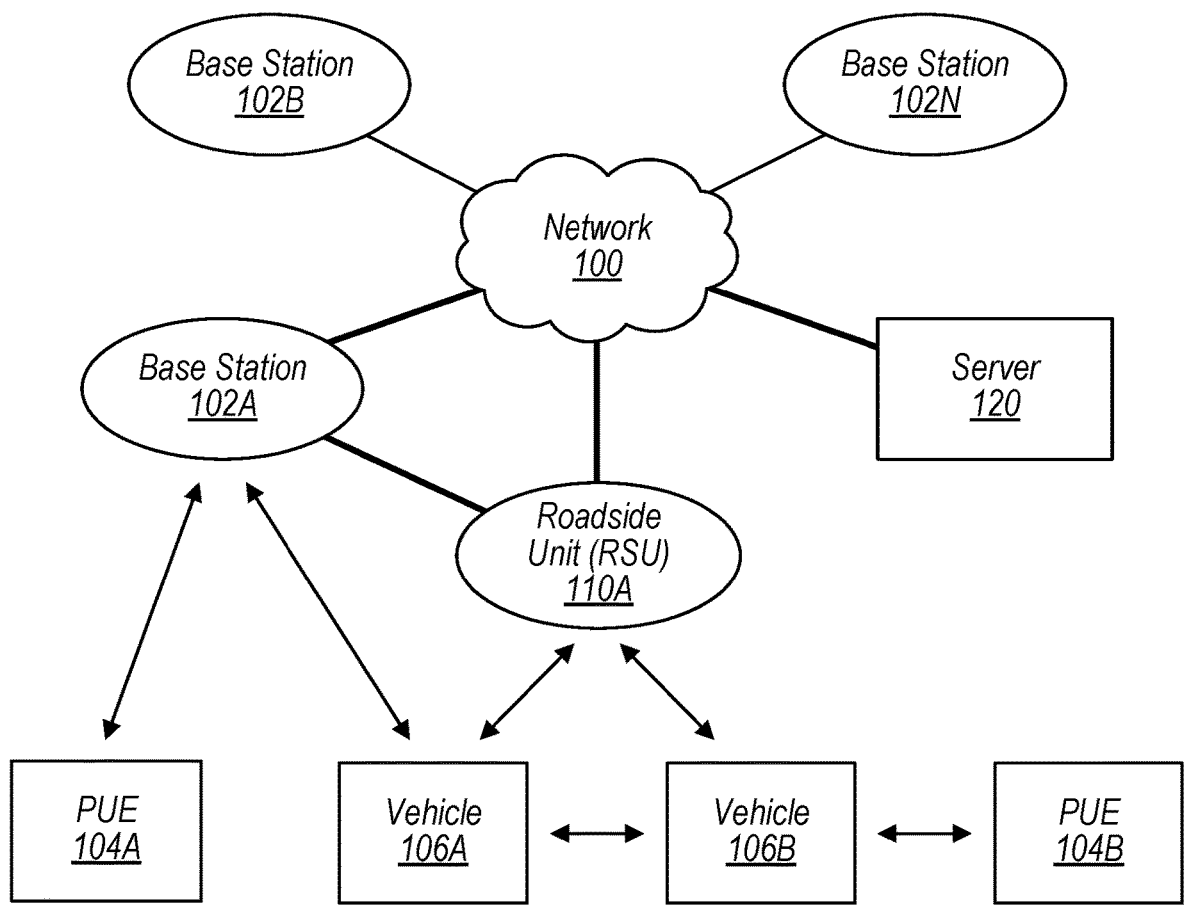
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems or devices that are mobile or portable and that perform wireless communications. Examples of UE devices include mobile telephones or smartphones (e.g., iPhone™ Android™-based phones), portable gaming devices (e.g., Nintendo DS™, PlayStation Portable™, Gameboy Advance™, iPhone™), laptops, wearable devices (e.g. smartwatch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements include, for example, processors and associated memory, portions or circuits of individual processor cores, entire processor cores, individual processors, circuits such as an ASIC (Application Specific Integrated Circuit), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle, or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing said wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V, HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

As shown, certain user devices may be able to conduct communications with one another directly, i.e., without an intermediary infrastructure device such as base station 102A or RSU 110A. As shown, vehicle 106A may conduct V2X-related communications directly with vehicle 106B. Similarly, the vehicle 106B may conduct V2X-related communications directly with PUE 104B. Such peer-to-peer communications may utilize a "sidelink" interface such as the PC5 interface in the case of some LTE embodiments. In certain LTE embodiments, the PC5 interface supports direct cellular communication between user devices (e.g., between vehicles 106), while the Uu interface supports cellular communications with infrastructure devices such as base stations. The LTE PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. For example, NR V2X sidelink communication techniques can also be used to perform device-to-device communications, at least according to some embodiments. Note also that some user devices in a V2X system (e.g., PUE 104A, as one possibility) may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and 106A.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, etc. Note that if the base station 102A is implemented in the context of LTE, it may alternately be referred to as an eNodeB', or eNB. Note that if the base station 102A is implemented in the context of NR, it may alternately be referred to as a 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may be capable of communicating with the base station 102A. The user devices shown, i.e., user devices 104A, 104B, 106A, and 106B may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, etc.), and/or other wireless communication protocols. In some embodiments, RSU 110A may be able to communicate with devices using a "sidelink" technology such as LTE PC5 or NR V2X sidelink communication techniques.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
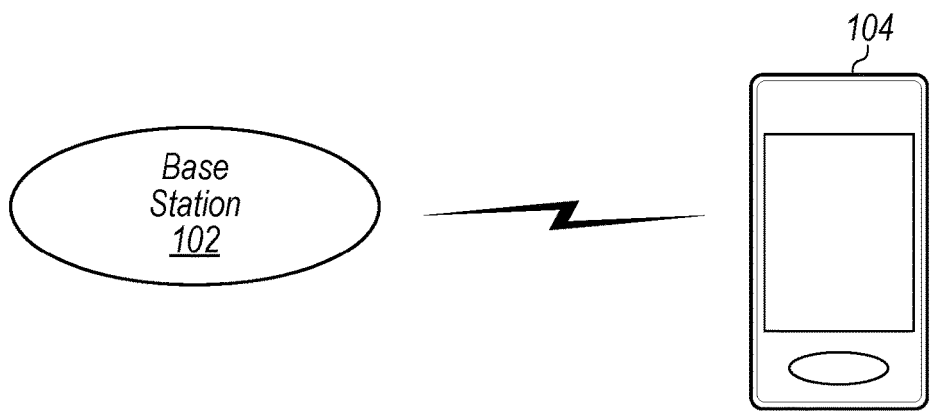
FIG. 2 illustrates a base station in communication with a user equipment (UE) device, according to some embodiments.

FIG. 2—Communication Between a UE and Base Station

FIG. 2 illustrates a user equipment (UE) device 104 (e.g., one of the PUEs 104A or 104B in FIG. 1) in communication with a base station 102 (e.g., the base station 102A in FIG. 1), according to some embodiments. The UE 104 may be a device with cellular communication capability such as a mobile phone, a hand-held device, a computer or a tablet, or virtually any type of portable wireless device.

The UE 104 may include a processor (processing element) that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array), an integrated circuit, and/or any of various other possible hardware components that are configured to perform any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
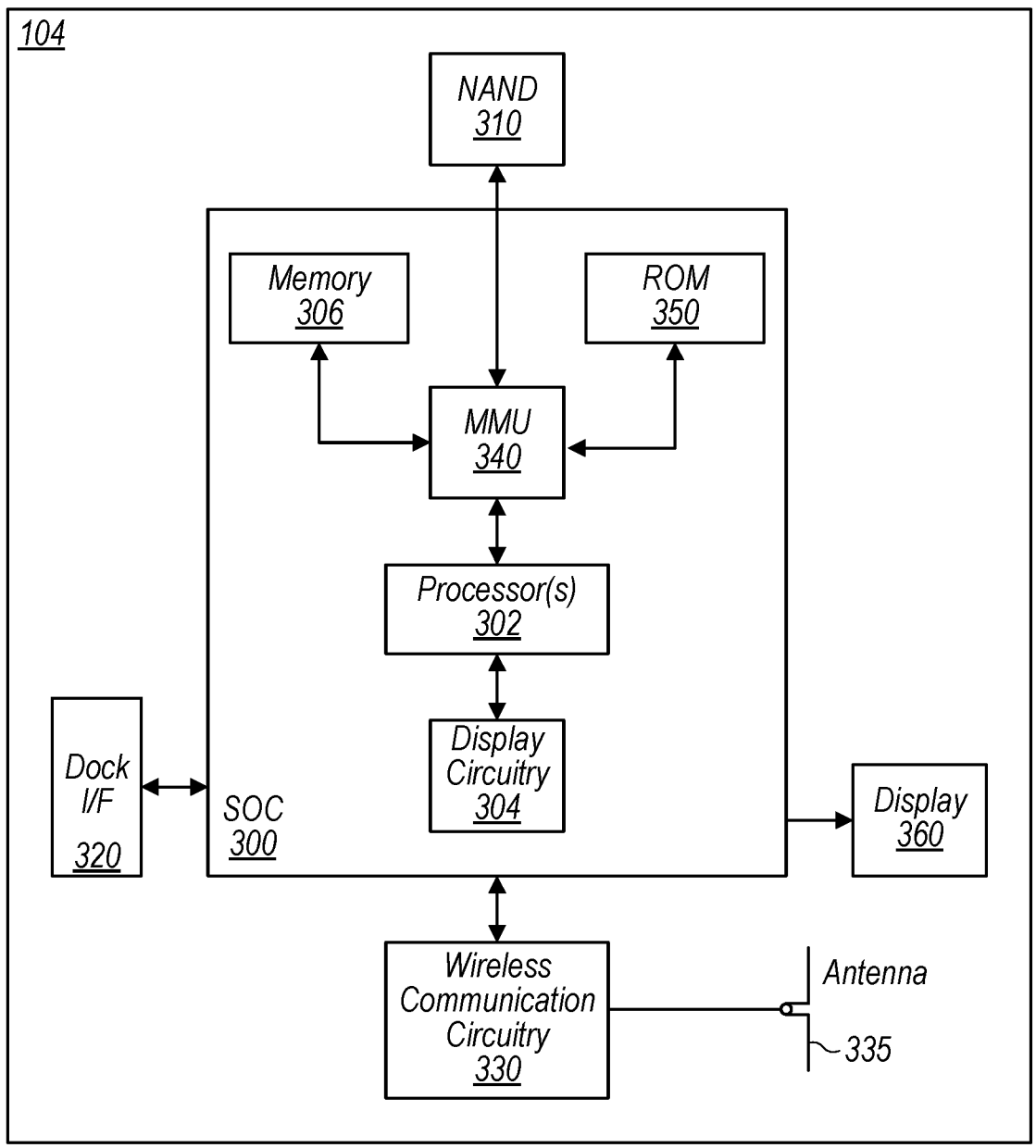
FIG. 3 is an example block diagram of a UE, according to some embodiments.

FIG. 3—Block Diagram of a UE

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing V2X sidelink communications, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
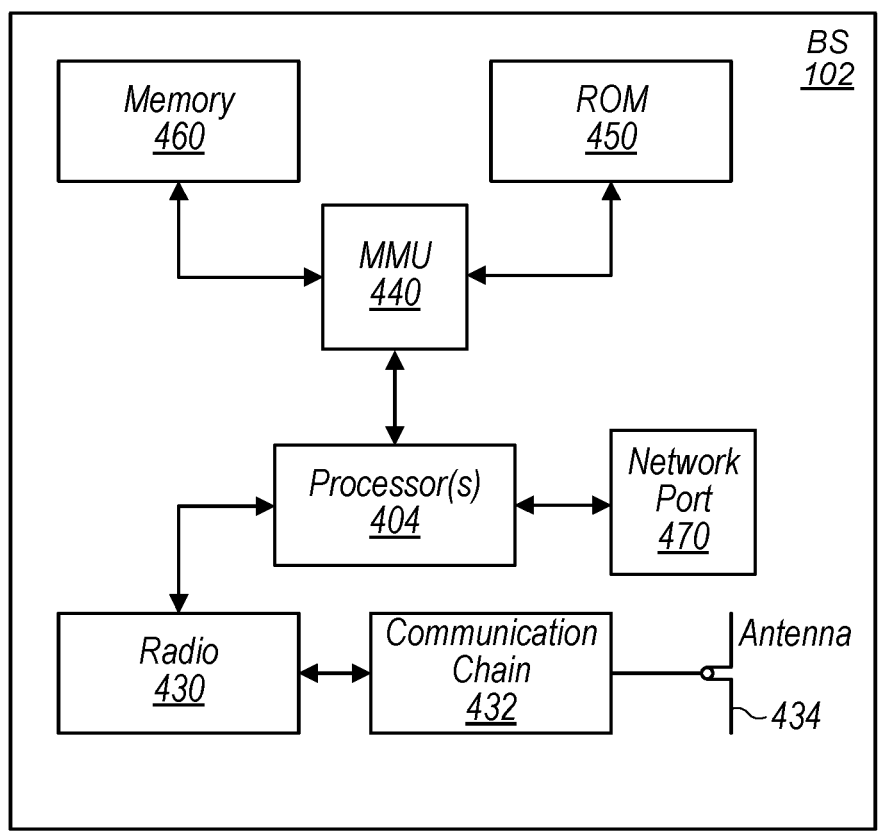
FIG. 4 is an example block diagram of a base station, according to some embodiments.

FIG. 4—Block Diagram of a Base Station

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

V2X Sidelink Communication

In wireless communications, specifically cellular wireless communications, sidelink communications represent a special kind of communication mechanism between devices that is not carried through a base station, e.g., through eNB/gNB. In other words, the devices communicate with each other without that communication going through a base station. In one sense, the devices may be said to be communicating with each other directly. Accommodation of such communication, however, requires a new physical layer design.

Many recent studies have identified the need for technical solutions for sidelink design, e.g. a sidelink design in 5G-NR, to meet the requirements of advanced V2X services, including support of sidelink unicast, sidelink groupcast and sidelink broadcast. A number of specific use cases have been identified for advanced V2X services, such as vehicle platooning, extended sensors, advanced driving, and remote driving.

In LTE V2X, broadcast sidelink communications are supported, in which maintenance of the sidelink connection is performed using keep-alive messages communicated between upper layers (e.g., application layers, non-access stratum layers, etc.) of the wireless devices in communication. NR V2X supports unicast and groupcast sidelink communications, e.g., in addition to broadcast sidelink communications.

In order to support such V2X sidelink communications, a variety of communication channels (e.g., control channels, data channels) may need to be provided. Accordingly, various possible techniques supporting V2X sidelink communication, including a variety of possible V2X channel design features and considerations, are proposed herein. The techniques may include techniques for slot aggregation and selective prioritization of communications over a physical sidelink feedback channel (PSFCH), and various other techniques.

According to some embodiments, the wireless device may be operating in a manner such that the wireless device performs resource selection for its V2X sidelink transmissions, which may also be referred to as a "mode 2" wireless device. In such a scenario, it may be beneficial for the wireless device to consider the potential impact on its transmissions of its own and/or other wireless devices' half-duplex limitations. For example, if the wireless device is unable to (or not configured to) transmit and receive simultaneously, scheduling a transmission during the same slot that the wireless device is scheduled to receive a transmission by another wireless device may result in the wireless device being unable to receive the transmission. Similarly, if a destination wireless device is unable to (or not configured to) transmit and receive simultaneously, scheduling a transmission to the destination wireless device during the same slot that the destination wireless device is scheduled to perform a transmission may result in the destination wireless device being unable to receive the transmission. Accordingly, at least in some embodiments, the wireless device may be configured to selectively prioritize particular transmissions and/or receptions for instances where a scheduled transmission and a scheduled reception at least partially overlap in time.

Scheduling Overlap for PSFCH Messages

Transmission and reception of PSFCH messages may be scheduled to overlap in time in a variety of different circumstances. As a first example, a wireless device may transmit a PSSCH message and configure a scheduled time slot for receiving a corresponding first acknowledgment message over a PSFCH. Additionally, the wireless device may receive sidelink control information (SCI) from a remote device over the PSSCH indicating a time slot for transmitting a second acknowledgment message over the PSFCH. In some cases, the PSFCH resources corresponding to these two PSFCH messages may appear in the same slot. In these cases, embodiments herein present methods and devices for selecting which of the PSFCH message to transmit or receive, based on data priority and/or other factors.

As a second example, a wireless device may be scheduled to simultaneously transmit multiple PSFCH messages, or it may be scheduled to simultaneously receive multiple PSFCH messages. In these embodiments, the wireless device may determine which PSFCH message is associated with the highest priority data, and may prioritize this PSFCH message for transmission and/or reception.

As a third example, a wireless device may receive SCI from multiple different wireless devices, and the associated PSFCH responses may appear in the same slot. Alternatively, a wireless device may receive multiple SCI messages from a single remote device, and the associated PSFCHs may appear in the same slot. In these embodiments, the wireless device may select a number of PSFCH transmissions to perform based on data priority.

In some embodiments, a scheduling conflict may occur between a sidelink (SL) feedback transmission or reception and an uplink (UL) transmission. Embodiments herein present methods and devices to selectively prioritize particular transmissions and/or receptions.

Acknowledgment and/or negative acknowledgment (ACK/NACK) messages sent over the PSFCH may have either a short PSFCH format or a long PSFCH format, in various embodiments. In some embodiments, a sequence-based short PSFCH format may be used for sidelink ACK/NACK messaging, where one or two symbols are used for the ACK/NACK message. Alternatively, a long PSFCH format may be used where more than two symbols are used for the ACK/NACK message, e.g., up to the size of an entire slot (e.g., up to 14 symbols for a 14-symbol slot structure).

In either of the long or short PSFCH formats, the ACK/NACK message may be repeated for each symbol to increase the likelihood of successful reception by the receiving device.

In some embodiments, sidelink control information (SCI) may be transmitted over the PSCCH and a data payload may be transmitted over the PSSCH. The SCI information may specify the resources to be used for an upcoming PSFCH ACK/NACK message associated with the data payload. In some embodiments, the SCI may specify a particular time, frequency and/or code resource. Typically, the PSFCH resources may be offset from the corresponding PSSCH by 2 or 3 slots (i.e., the PSFCH may be scheduled to occur 2 or 3 slots after the PSSCH).

Embodiments here present methods and devices to further enhance PSFCH coverage for longer distances and poor radio conditions. For example, in some embodiments, long PSFCH format slot aggregation is utilized to increase message fidelity. Some embodiments present prioritization rules for resolving scheduling conflicts between PSFCH transmission and reception in a long PSFCH format with slot aggregation. Some embodiments present prioritization rules for resolving scheduling conflicts between multiple simultaneous PSFCH transmissions in a long PSFCH format with slot aggregation. Some embodiments present prioritization rules for resolving scheduling conflicts between multiple simultaneous PSFCH transmissions in a long PSFCH format with slot aggregation and a short PSFCH format. Some embodiments present prioritization rules for resolving scheduling conflicts between PSFCH transmissions in a long PSFCH format with slot aggregation and uplink transmissions.

PSFCH Slot Aggregation

Figure 5A:
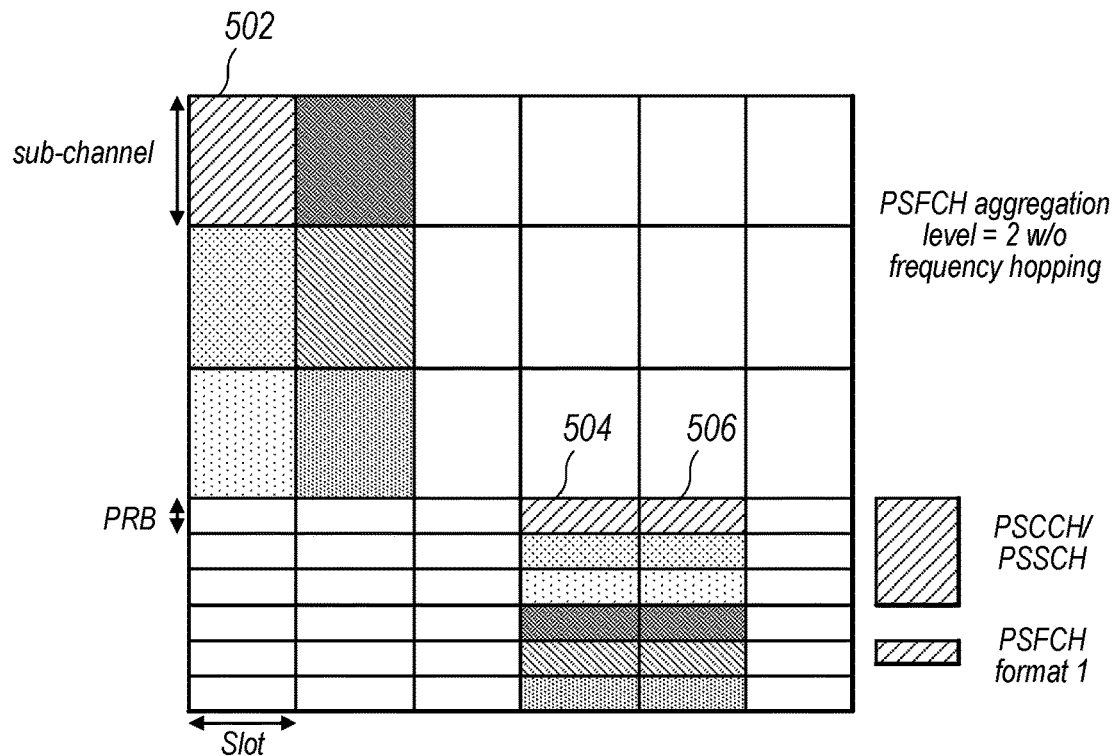
FIGS. 5A-C illustrate resource pools indicating resource allocations implementing slot aggregation for sidelink feedback communications, according to some embodiments.

In some embodiments, a wireless device may configure slot aggregation for PSFCH feedback messaging. For example, each data packet transmitted over a PSSCH resource may have corresponding PSFCH resources scheduled in a plurality of consecutive time slots for ACK/NACK feedback, starting from a configured (or pre-configured) gap after the PSSCH time resource. As used herein, the term "resource" is intended to refer to one or both of a frequency resource and/or a time resource dedicated for transmission or reception of a particular message over a particular channel, such as the PSSCH, PSCCH or PSFCH. As illustrated in FIG. 5A, six different PSCCH/PSSCH resources each have two corresponding PSFCH time resources, corresponding to an aggregation level of N=2. As illustrated, each PSCCH and PSSCH resource occupies a single time slot and a single sub-channel, whereas each PSFCH resource occupies a single time slot and a single physical resource block (PRB). For example, the sub-channel and time slot resource 502 is utilized to transmit both sidelink control information over the PSCCH and sidelink data over the PSSCH. The sidelink control information in the resource 502 schedules the resources 504 and 506 for sending acknowledgment messaging over the PSFCH corresponding to the sidelink data sent over the resource 502.

Figure 5B:
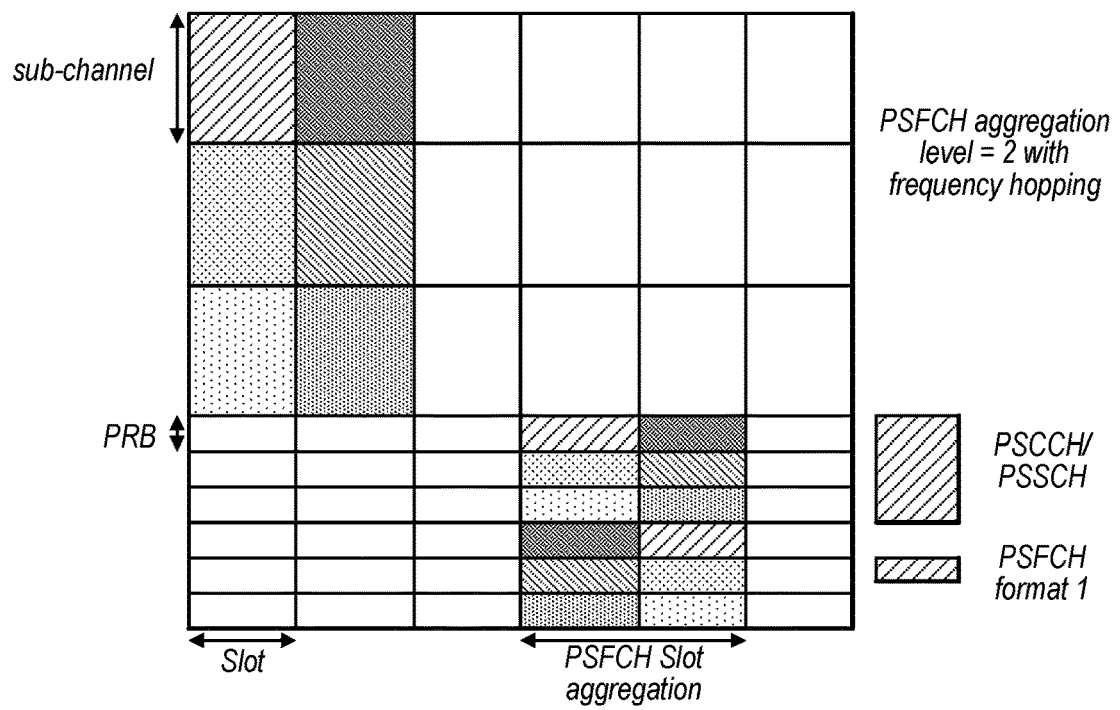

In some embodiments, as shown in FIG. 5B, frequency hopping may be employed on the PSFCH repetition. For example, to achieve a frequency diversity gain, the two aggregate time slots for PSFCH messaging may be configured on two different frequency resources. The PSFCH frequency offset may be part of a resource pool configuration or pre-configuration, in various embodiments.

In some embodiments, PSFCH slot aggregation may be configured using a sidelink control information (SCI) indication. In some embodiments, the aggregation level (i.e., the number of PSFCH time slots for each PSSCH resource) may be indicated in SCI stage 2.

In some embodiments, the maximum number of aggregate PSFCH slots may be upper bounded by a resource pool (pre)configuration. For example, the resource pool may configure N=4 as the maximum PSFCH aggregation level, whereas a particular SCI indicator transmitted by a wireless device may configure an actual aggregation level of 2. The wireless device may determine its desired aggregation level based on a variety of factors, such as current radio conditions, reference signal received power (RSRP) of a remote device, distance to a remote device, etc. The size of the stage 2 SCI indicator indicating the aggregation level may be equal to $\log_2 N$, in some embodiments. In various embodiments, PSFCH slot aggregation may be configured for either a PSFCH long format or a PSFCH short format.

Figure 5C:
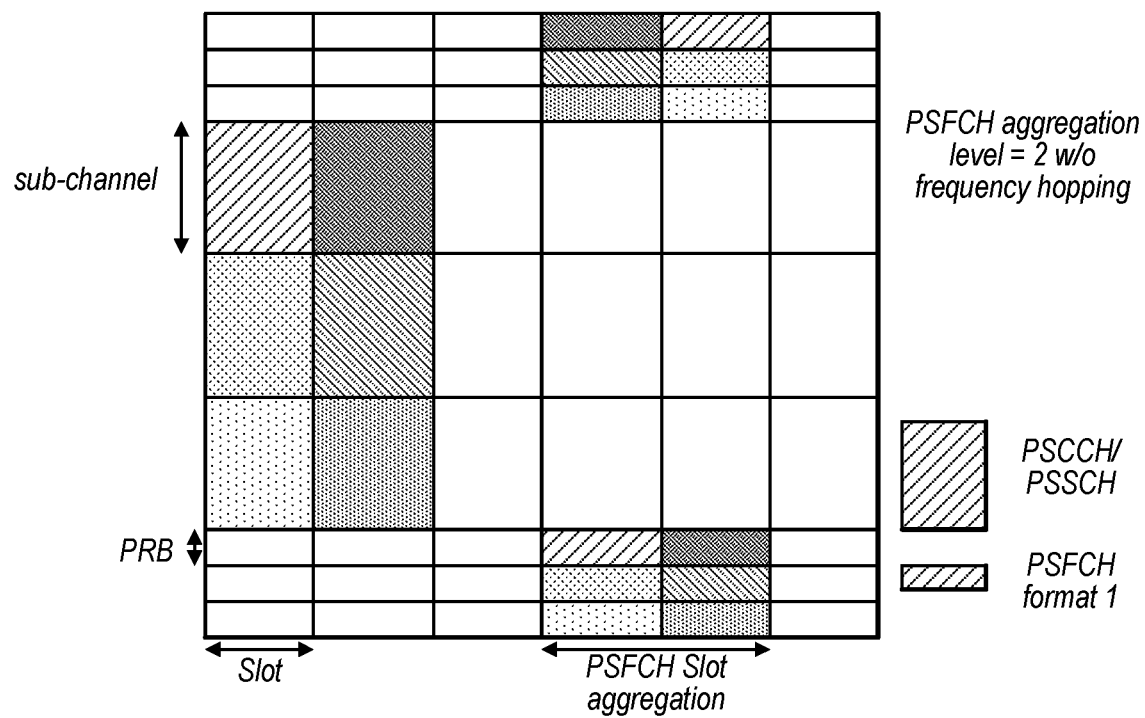

In some embodiments, as shown in FIG. 5C, the two aggregate PSFCH resources may be configured on either side of the frequency resource pool utilized for the PSSCH and the PSCCH. Advantageously, this configuration may result in a greater diversity gain for the PSFCH resources than for the configuration shown in FIGS. 5A and 5B.

Prioritization Between PSFCH Transmissions and Receptions

Figure 6A:
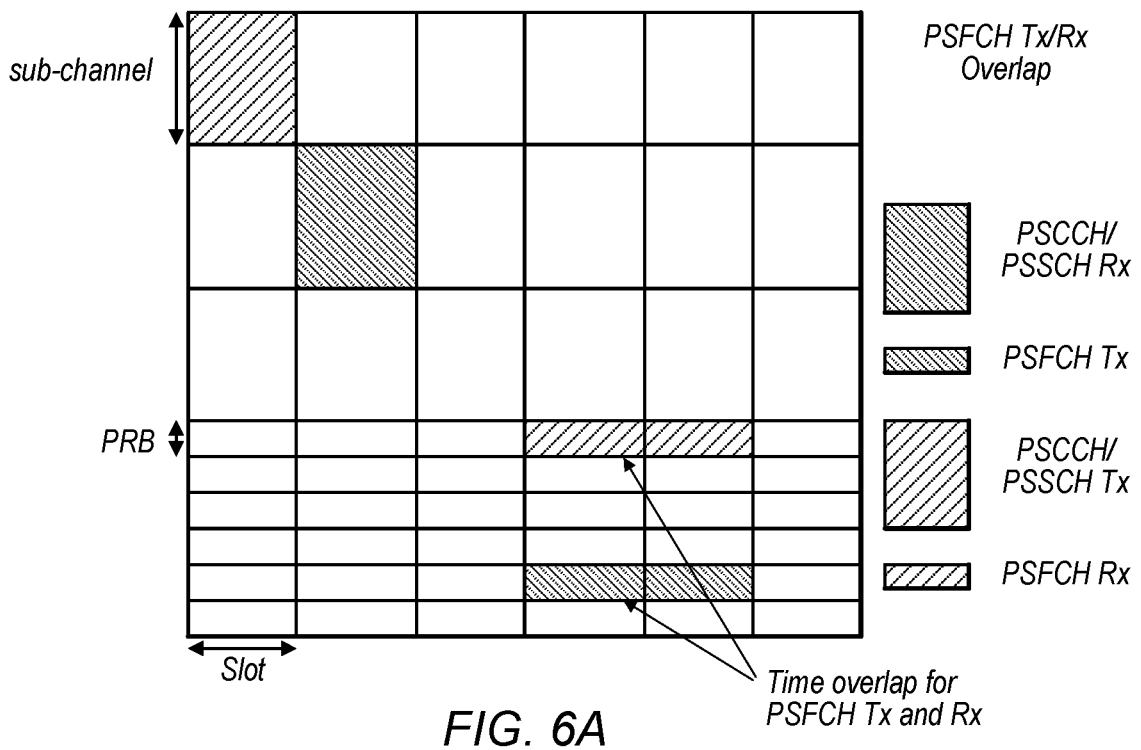
FIGS. 6A-B are resource pools illustrating selective prioritization for sidelink feedback transmission and reception, according to some embodiments.
Figure 6B:
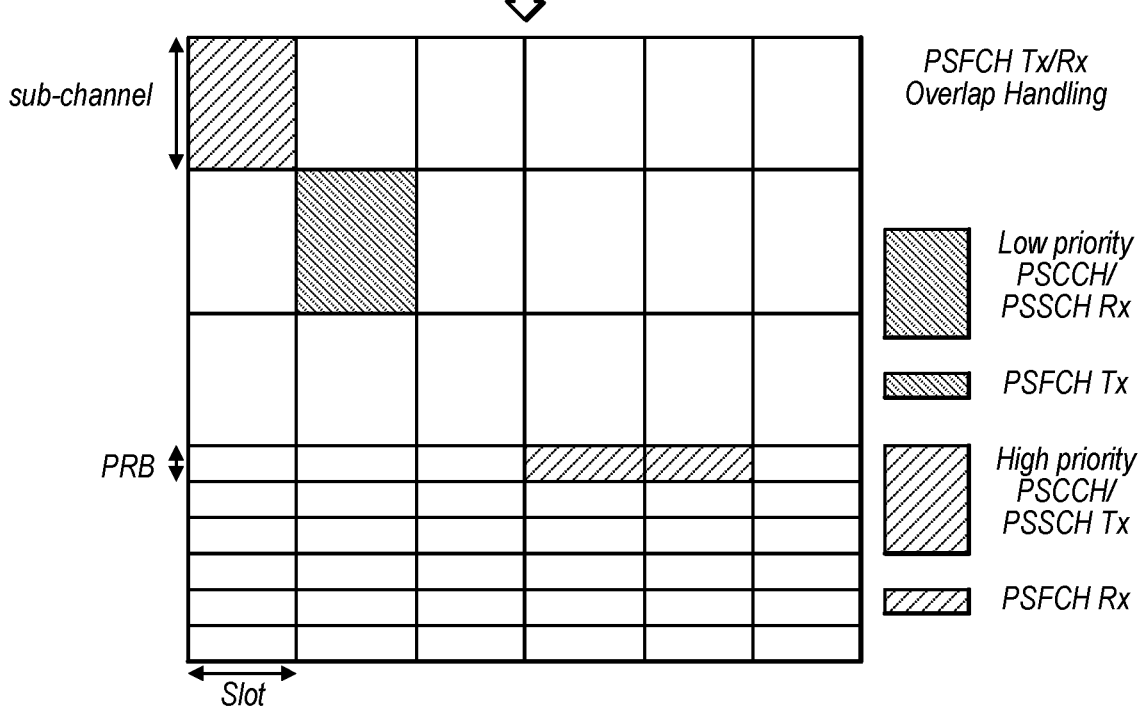

In some embodiments, methods and devices are described to perform selective prioritization for PSFCH ACK/NACK messaging when scheduled PSFCH transmissions and receptions overlap in time. One example is illustrated in FIG. 6A, where a wireless device transmits messaging over the PSCCH and the PSSCH in a first time slot (PSCCH/PSSCH transmission, Tx), and the wireless device receives messaging over the PSCCH and the PSSCH in a subsequent neighboring second time slot (PSCCH/PSSCH reception, Rx). In this example, and as shown in FIG. 6A, it may occur that the PSCCH/PSSCH transmission and the PSCCH/PSSCH reception are scheduled for PSFCH feedback during the same time slots for receiving and transmitting HARQ feedback, respectively. If the wireless device is a half-duplex device, the wireless device may be unable to simultaneously transmit and receive PSFCH messaging in the same slot. To address these and other concerns, the priority of the data associated with the overlapping PSFCH feedback messages may be considered to determine whether to transmit or receive ACK/NACK messaging during the overlapped time slot(s). For example, the wireless device may determine whether a first data packet transmitted over the PSSCH during the first time slot or a second data packet received over the PSSCH during the second time slot has a higher priority. As illustrated in FIG. 6B, the wireless device may transmit or receive the PSFCH message corresponding to the higher priority PSSCH data packet.

In some embodiments, if both the first and second data packets have the same priority, the wireless device may autonomously determine which PSFCH message to perform. For example, in these circumstances, the wireless device may default to always transmit a PSFCH message, or alternatively to always receive a PSFCH message when their respective associated data packets have the same priority.

Figure 7A:
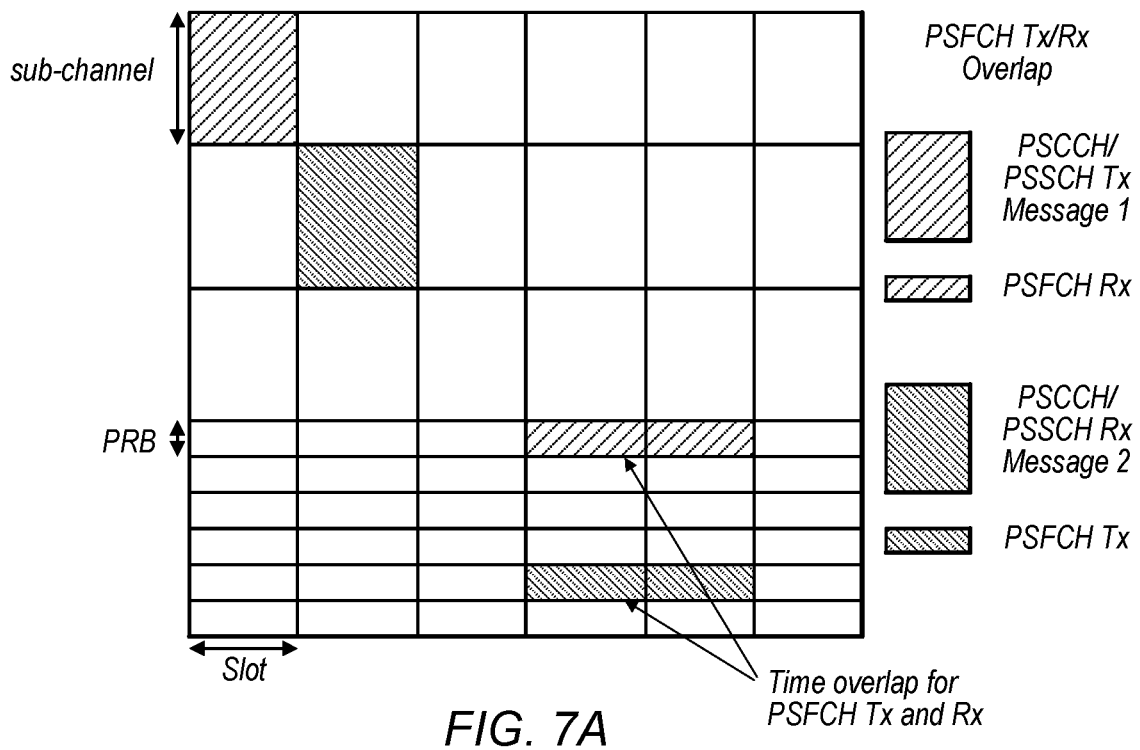
FIGS. 7A-B are resource pools illustrating resource sharing for sidelink feedback transmission and reception, according to some embodiments.
Figure 7B:
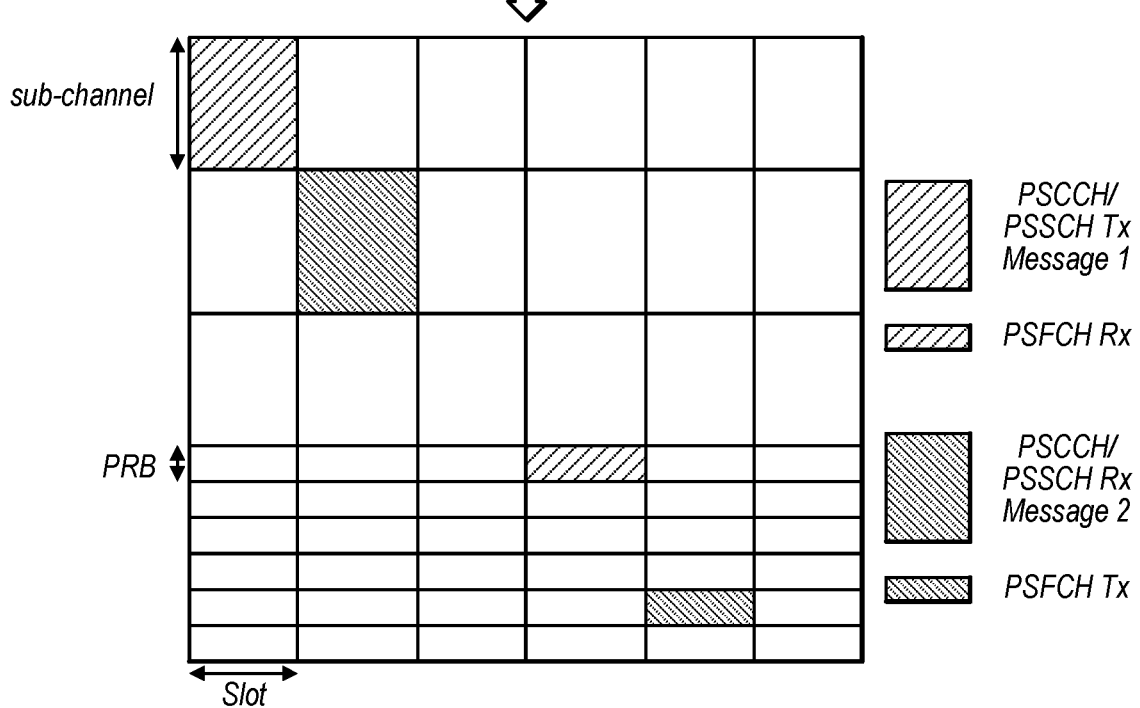

In some embodiments, time sharing of PSFCH messaging may be performed in conjunction with slot aggregation for one or both of the Tx and/or Rx PSFCH messages. In these embodiments, time sharing may be implemented to accommodate both the Tx and Rx PSFCH messaging. For example, as illustrated in FIGS. 7A-B, if the aggregation level of the Tx PSFCH message and the Rx PSFCH message is 2, the wireless device may allocate one of the aggregate time slots for the Tx PSFCH message and the other of the aggregate time slots for the Rx PSFCH message. In some embodiments, the PSFCH message corresponding to the earlier PSSCH message may be allocated the earlier time slot(s) of the aggregate time slots. For example, as shown in FIG. 7B, the PSCCH/PSSCH message 1 is transmitted before the PSCCH/PSSCH message 2 is received. Accordingly, the PSFCH message corresponding to message 1 may be received in the earlier of the two aggregate time slots, while the PSFCH message corresponding to message 2 may be transmitted in the later of the two aggregate time slots.

Figure 8A:
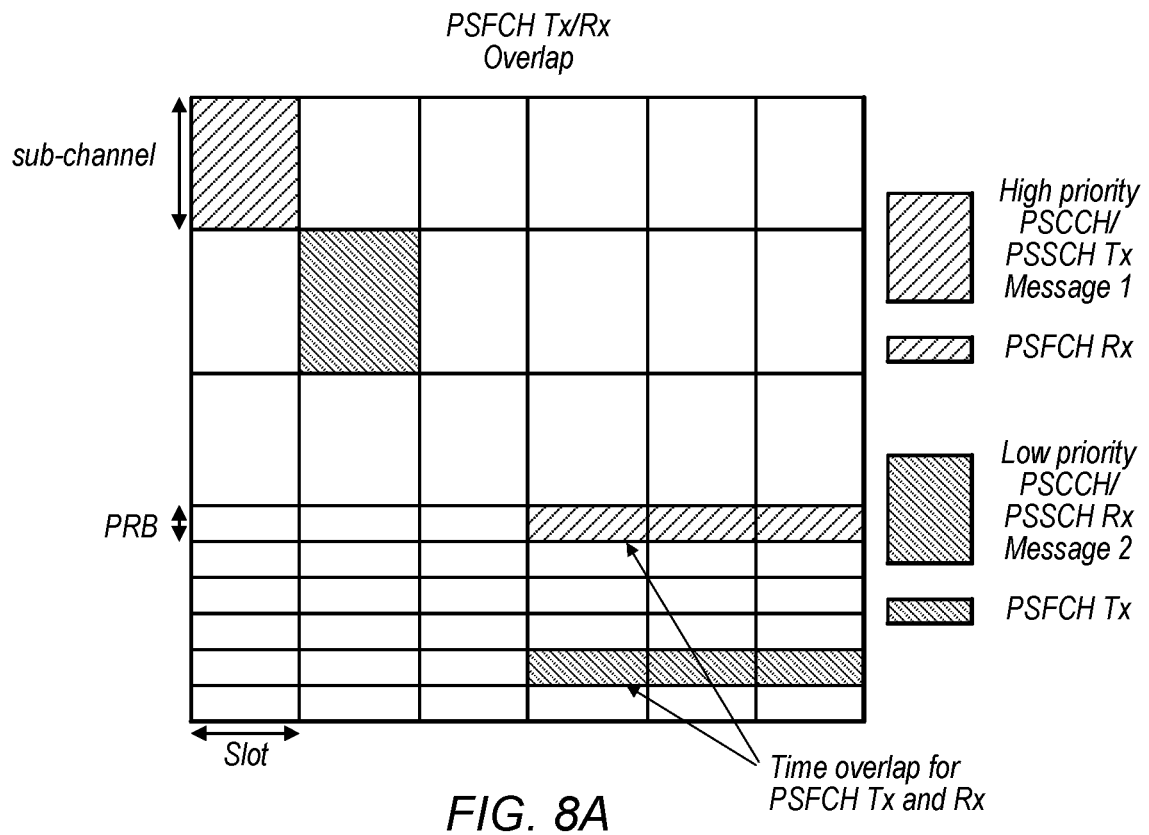
FIGS. 8A-B are resource pools illustrating weighted resource sharing sidelink feedback transmission and reception, according to some embodiments.
Figure 8B:
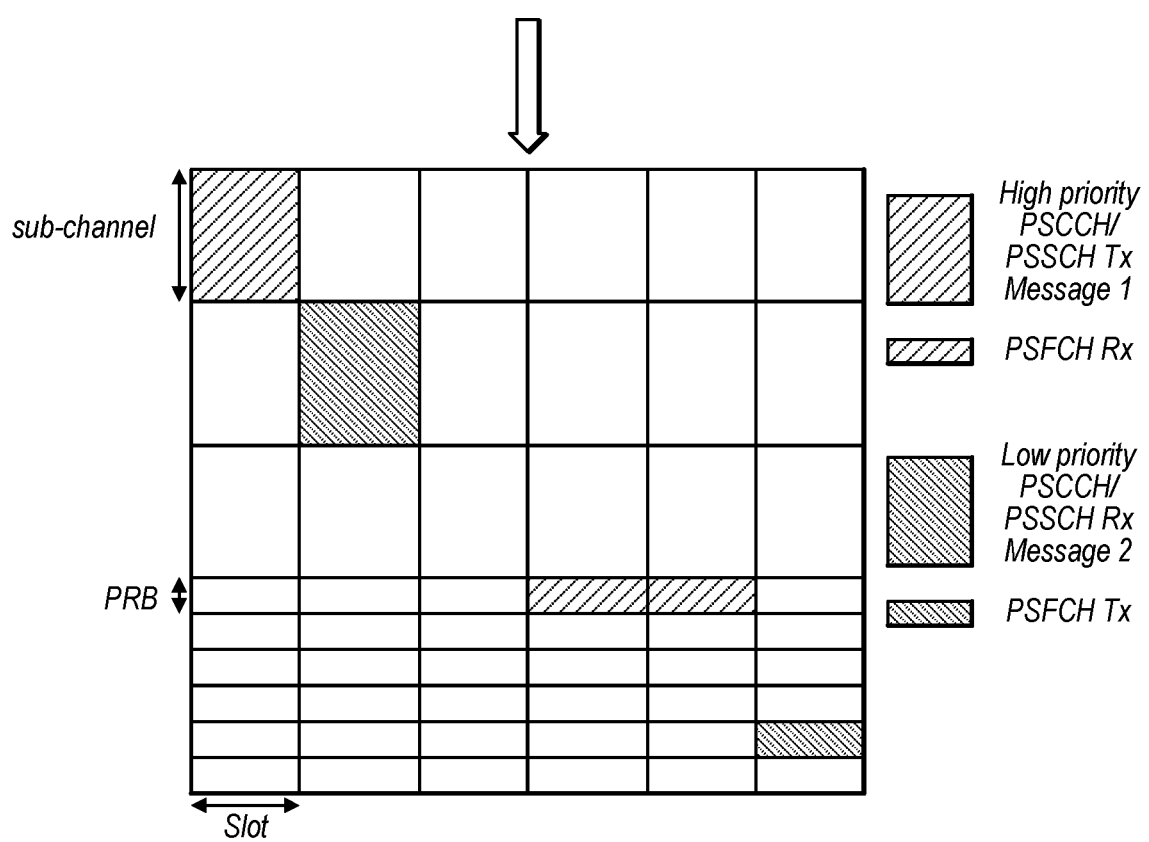

In some embodiments, if the PSFCH aggregation level is more than 2, uneven PSFCH slot allocation may be applied, depending on the quality of service requirements and/or priority levels of the data packets corresponding to the two PSFCH messages. For example, as illustrated in FIGS. 8A-B, PSCCH/PSSCH message 1 is higher priority than PSCCH/PSSCH message 2, and the PSFCH message corresponding to the higher priority data may have more slots allocated than the PSFCH message corresponding to the lower priority data.

In some embodiments, if the difference in priority between two PSSCH data packets is sufficiently large, the PSFCH messaging associated with the high priority PSSCH data packet may be allocated the entirety of the aggregate time slots. For example, if the Tx data packet sent over the PSSCH has a priority that is greater than the Rx data packet received over the PSSCH by more than a threshold amount, the entirety of the scheduled PSFCH time slots may be allocated to the PSFCH message corresponding to the Tx data packet (or vice versa). In some embodiments, different types of data packets may be designated different priorities on a scale from 1 (highest priority) to 8 (lowest priority). A priority difference threshold may be set (as one example, the priority difference threshold may be set to 6). If one data priority is level 1 (highest) and the other data priority is level 8 (lowest), the gap between these two priority levels is 7, which is larger than the priority difference threshold. Alternatively, a priority threshold level may be set (e.g., 4), wherein if the data priority of PSSCH Tx is larger than a threshold, and data priority of the PSSCH Rx is smaller than the threshold, the entirety of the scheduled PSFCH time slots may be allocated to the PSFCH message corresponding to the Tx data packet (or vice versa).

In some embodiments, the distance between the transmitting and receiving wireless devices may also be considered in allocating aggregate time slots for PSFCH messaging. In some embodiments, a gap symbol may be added at the end of a time slot for PSFCH messaging.

While embodiments herein have been described in the context of a time overlap between a Tx PSFCH message and an Rx PSFCH message, similar prioritization rules may be applied to the case of time overlap between multiple PSFCH Tx messages.

Figure 9A:
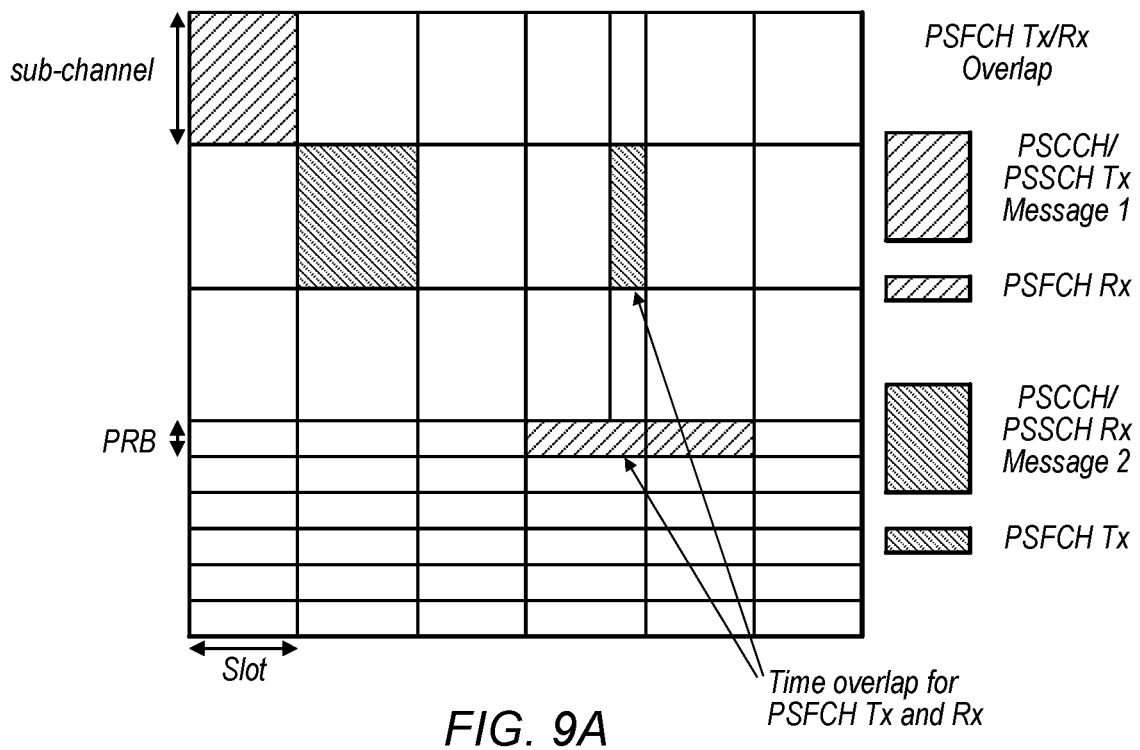
FIGS. 9A-B are resource pools illustrating selective prioritization of long and short format sidelink feedback transmission and reception, according to some embodiments.

In some embodiments, two scheduled PSFCH messages may partially overlap. For example, as shown in FIG. 9A, the PSFCH message corresponding to message 1 may be a long format PSFCH message with an aggregation level of two, and one of scheduled PSFCH Rx resources may partially overlap with the PSFCH resource corresponding to message 2. The PSFCH message corresponding to message 2 may have a short PSFCH format including only one or two symbols (i.e., rather than occupying an entire slot).

Figure 9B:
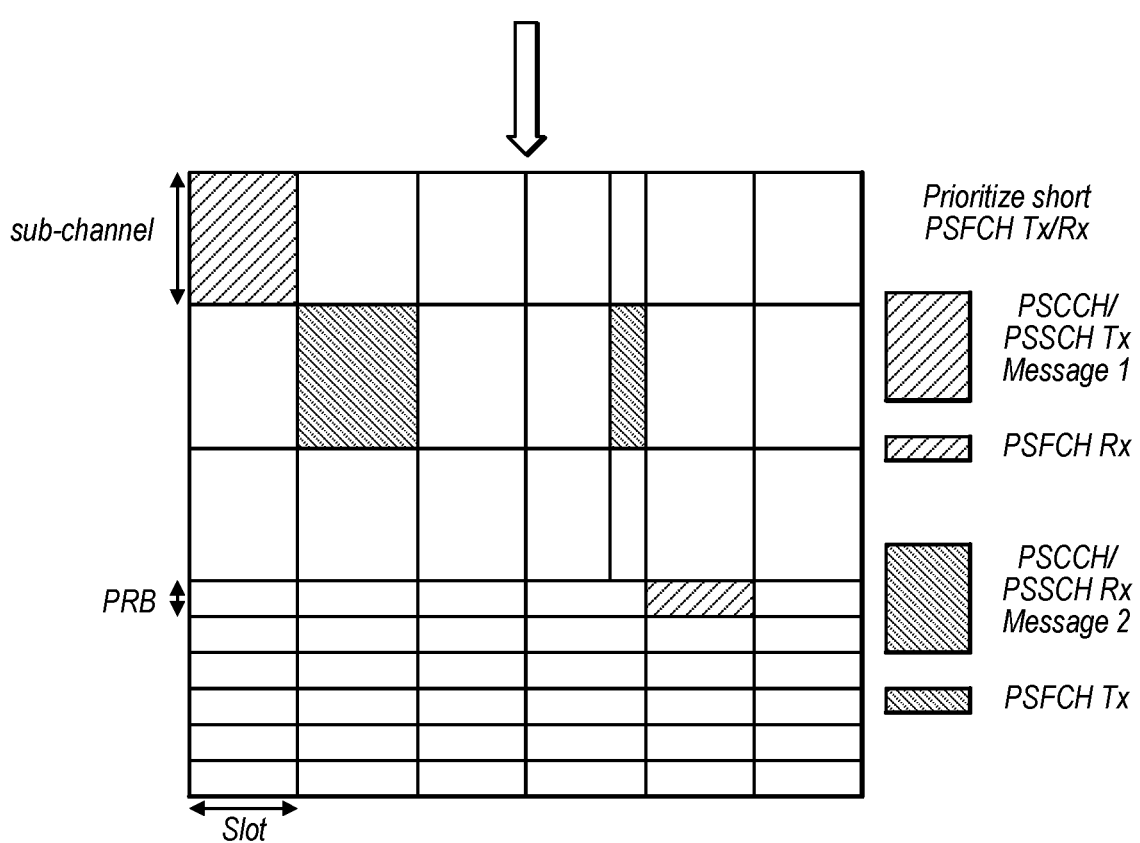

In some embodiments, similar to the methods described in reference to FIGS. 6A-B, the priorities and/or quality of service (QoS) requirements of message 1 and message 2 may be compared to determine which of the PSFCH messages to transmit or receive. Alternatively, as shown in FIG. 9B, time sharing may be employed where the short format PSFCH transmission is performed in the first of the two aggregate time slots, whereas the long format PSFCH reception is performed in the second non-time overlapped time slot.

In some embodiments, if the data priority of the PSSCH data packet corresponding to the long format PSFCH message is much larger than the data priority of the PSSCH data packet corresponding to the short format PSFCH message (i.e., larger by more than a pre-determined threshold), all of the aggregate PSFCH time slots may be used for the long format PSFCH message. Alternatively, a pre-determined priority threshold may be set whereby, if the data priority of the PSSCH data packet corresponding to the long format PSFCH message is larger than the threshold and the data priority of the PSSCH data packet corresponding to the short format PSFCH message is smaller than the threshold, all of the aggregate PSFCH time slots may be used for the long format PSFCH message.

Additionally or alternatively, in some embodiments, the distance between transmitting and receiving wireless devices may also be considered in configuring the PSFCH slot aggregation. Similar prioritizations rule may be applied for cases where multiple overlapping PSFCH transmissions are scheduled.

Figure 10:
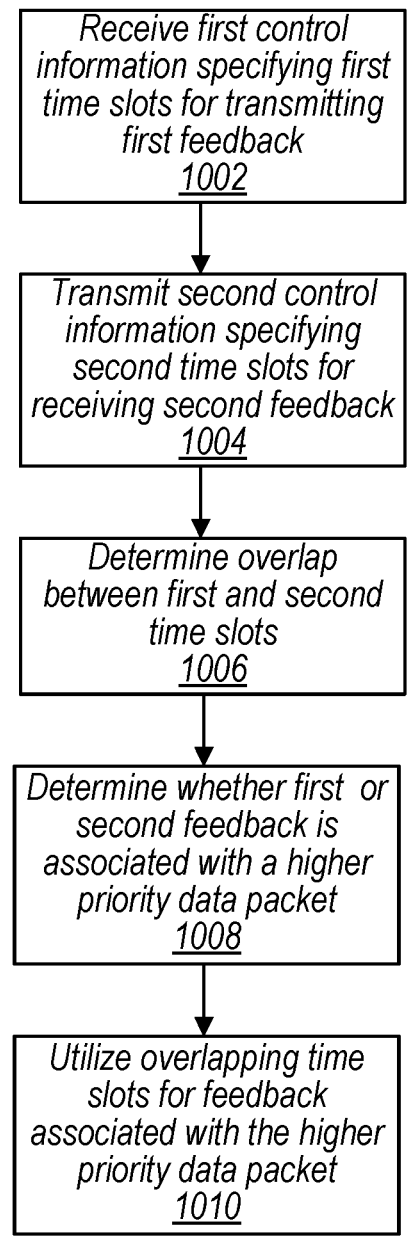
FIG. 10 is a flowchart diagram illustrating a method for performing selective prioritization for sidelink feedback transmission and reception, according to some embodiments.

FIG. 10—Flowchart for Selective PSFCH Prioritization

FIG. 10 is a flowchart diagram illustrating example aspects of methods and devices for performing selective PSFCH prioritization, at least according to some embodiments. Aspects of the method of FIG. 10 may be implemented by a wireless device, such as a PUE 104, vehicle 106, any of various other possible wireless devices illustrated in various of the Figures herein, and/or more generally in conjunction with any of the computer circuitry, systems, devices, elements, or components shown in the above Figures, among others, as desired. For example, a processor (e.g., a baseband processor and/or other hardware) installed within such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 10 may operate as follows.

At 1002, first control information is received through a sidelink control channel specifying one or more first time slots for the wireless device to transmit a first acknowledgment message over a sidelink feedback channel. The first acknowledgment message is related to a first data packet received by the wireless device. In some embodiments, the sidelink feedback channel is PSFCH, the sidelink control channel is a PSCCH, and the first data packet is received over a PSSCH. The first control information and the first data packet may be received during a single common subchannel and time slot, and the acknowledgment message may be used to indicate whether the first data packet was successfully received.

At 1004, second control information is transmitted through the sidelink control channel specifying one or more second time slots for the wireless device to receive a second acknowledgment message over the sidelink feedback channel. The second acknowledgment message is related to a second data packet transmitted by the wireless device. For example, second acknowledgment message may indicate whether the second data packet was successfully received by a second device. The second control information and the second data packet may be transmitted during a single common subchannel and time slot.

At 1006, it is determined that one or more of the first time slots coincide with one or more of the second time slots. For example, at least some of the first time slots may overlap with at least some of the second time slots. If the wireless device is a half-duplex device that is not able to simultaneously receive and transmit messages simultaneously, selective prioritization may be employed to determine which of the sidelink acknowledgment messages to transmit or receive during the overlapping time slots.

At 1008, it is determined whether the first data packet or the second data packet has a higher priority. For example, each of the first and second data packets may include a specified data priority level (e.g., on a scale of 1 for highest priority to 8 for lowest priority, or another type of priority scale may be used), and these priority levels may be compared.

Alternatively, in some embodiments, the format of the first and second acknowledgment messages may be used to determine priority. For example, in some embodiments it may be determined that one of the first or second acknowledgment messages is to be transmitted/received according to a long PSFCH format and the other is to be received/transmitted according to a short PSFCH format. In these embodiments, the acknowledgment message that is to be transmitted or received according to the short PSFCH format may be prioritized during the overlapping time slot.

At 1010, at least a subset of the overlapping time slots are utilized for transmitting or receiving either the first or second acknowledgment message, respectively, depending on whether the first or second acknowledgment message is associated with a higher priority data packet.

For example, when it is determined that the first data packet has the higher priority, the first acknowledgment message is transmitted during a first subset of the first time slots that coincide with one or more of the second time slots, and the second acknowledgment message is not received during the first subset of the first time slots. Alternatively, when it is determined that the second data packet has the higher priority, the second acknowledgment message is received during the first subset of the first time slots and the first acknowledgment message is not transmitted during the first subset of the first time slots.

In some embodiments, one or both of the first time slots and the second time slots include an aggregate plurality of time slots. The first subset of the first time slots may include a first portion of the aggregate plurality of time slots, and the second acknowledgment message may be received during a second portion of the aggregate plurality of time slots that is disjoint from the first portion. The first portion may be selected to be larger than the second portion based at least in part on the determination that the first data packet has the higher priority.

In some embodiments, it may be determined that the first data packet is to be received before the second data packet is to be transmitted. Based on this determination, the first portion of the aggregate plurality of time slots may be selected to occur before the second portion of the aggregate plurality of time slots. Alternatively, it may be determined that the first data packet is to be received after the second data packet is to be transmitted, and the first portion of the aggregate plurality of time slots may be selected to occur after the second portion of the aggregate plurality of time slots based on this determination.

In some embodiments, it may be determined that the first data packet and the second data packet differ in priority by more than a predetermined threshold amount, and based on this determination, the first subset of the first time slots used for transmitting/receiving the higher priority acknowledgment message may include all of the overlapping time slots.

In some embodiments, control information may be utilized to configure aggregate time slots for PSFCH feedback. For example, one or both of the first or second control information may include a sidelink control information (SCI) stage 2 indication that specifies an aggregation level for transmitting or receiving acknowledgment messages over the sidelink feedback channel, where a number of time slots equal to the aggregation level are used for transmitting or receiving the acknowledgment messaging. In some embodiments, the control information may specify frequency hopping for the acknowledgment messaging, whereby the acknowledgment messaging is to be transmitted or received during different aggregate time slots over different frequency bands. In some embodiments, the frequency hopping may be configured such that one of the frequency bands used for feedback messaging is higher than a frequency band used to transmit or receive the control information, while another of the frequency bands used for feedback messaging is lower than the frequency band used to transmit or receive the control information. In other words, the physical sidelink control channel (PSCCH) and the physical sidelink shared channel (PSSCH) may utilize a first frequency band, and the PSFCH may utilize at least two frequency bands on either side of the first frequency for different time slots of the two or more aggregate time slots. Advantageously, the frequency diversity gain may be enhanced in these embodiments by increasing the difference in frequency between two of the frequency bands used for sidelink feedback messaging (e.g., compared to utilizing two adjacent frequency bands for sidelink feedback messaging).

Figure 11:
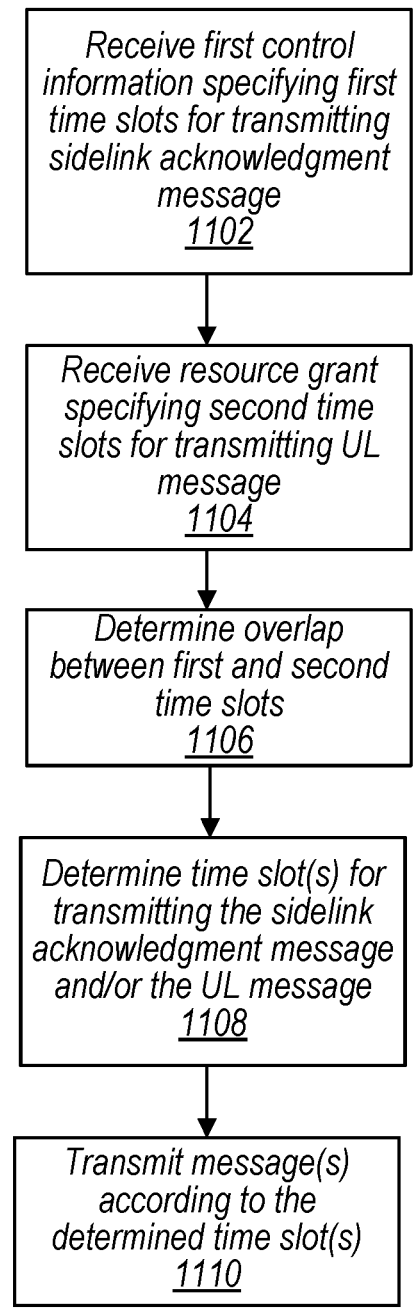
FIG. 11 is a flowchart diagram illustrating a method for performing selective prioritization for sidelink feedback transmissions and uplink data transmissions, according to some embodiments.

FIG. 11—Flowchart for PSFCH and UL Transmission Prioritization

In some embodiments, a scheduled PSFCH message may overlap in time with a scheduled uplink transmission. In these cases, in some embodiments, uplink transmissions may be always prioritized. For example, the time-overlapped PSFCH may be dropped or power restricted, whereas non-time-overlapped PSFCH transmissions may be performed as normal with normal transmit power. Alternatively, in some embodiments existing NR V2X prioritization rules may be reused for overlapping uplink transmissions and PSFCH transmissions. For example, the higher prioritized data may be transmitted in the overlapping time slot.

FIG. 11 is a flowchart diagram illustrating example aspects of methods and devices for performing selective prioritization between sidelink feedback messaging and uplink data transfers, at least according to some embodiments. Aspects of the method of FIG. 11 may be implemented by a wireless device, such as a PUE 104, vehicle 106, any of various other possible wireless devices illustrated in various of the Figures herein, and/or more generally in conjunction with any of the computer circuitry, systems, devices, elements, or components shown in the above Figures, among others, as desired. For example, a processor (e.g., a baseband processor and/or other hardware) installed within such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 11 may operate as follows.

At 1102, control information is received through a sidelink control channel. The control information specifies one or more first time slots for the wireless device to transmit a sidelink acknowledgment message over a sidelink feedback channel, where the sidelink acknowledgment message is related to a first data packet received by the wireless device. The first data packet may be received during the same time and frequency resource within which the control information is received. The control information may be received over a physical sidelink control channel (PSCCH), whereas the first data packet is received over a physical sidelink shared channel (PSSCH).

In some embodiments, the control information is a sidelink control information (SCI) stage 2 indication. The SCI stage 2 indication may indicate an aggregation level of the plurality of time slots.

At 1104, a resource grant is received through a downlink control channel. The resource grant may be received over a physical downlink control channel (PDCCH). The resource grant specifies one or more second time slots for the wireless device to transmit an uplink transmission, such as a second data packet (i.e., an uplink data packet) or control information (e.g., HARQ-ACK messaging, CSI reporting, etc.) over an uplink channel. The uplink channel may be a physical uplink shared channel (PUSCH) (e.g., for an uplink data packet) or a physical uplink control channel (e.g., for control information).

At 1106, it is determined that one or more of the first time slots coincide with one or more of the second time slots. For example, at least some of the first time slots may overlap with at least some of the second time slots. If the wireless device is not able to transmit two messages simultaneously, selective prioritization may be employed to determine which of the sidelink acknowledgment message or the uplink transmission to transmit during the overlapping time slots.

At 1108, time slots are determined for transmitting the sidelink acknowledgment message and/or the second data packet, and at 1110, one or more messages are transmitted according to the determination made at step 1108. Various methodologies may be employed for determining which message(s) to transmit during the overlapping time slots, as detailed below.

As a first example, in some embodiments, the uplink transmission is prioritized by default over the sidelink acknowledgment messaging. In other words, the second data packet is transmitted over the uplink channel during the first time slots that coincide with one or more of the second time slots, and the sidelink acknowledgment message is not transmitted during the overlapping first time slots.

Alternatively, the wireless device may be equipped with dual radios such that the uplink transmission and the sidelink acknowledgment messaging may both be transmitted during a single time slot. In these embodiments, it may be desirable to reduce a transmission power used for transmitting the sidelink acknowledgment messaging, to reduce the likelihood of creating intermodulation issues between the uplink data transmission and the sidelink acknowledgment transmission. In these embodiments, the wireless device may transmit the uplink transmission with a normal transmission power over the uplink channel during the one or more first time slots that coincide with one or more of the second time slots, and the wireless device may transmit the sidelink acknowledgment message with a reduced transmission power during the overlapping one or more first time slots. In some embodiments, the first time slots are an aggregate plurality of time slots, where only a subset of the first time slots overlap with the second time slots. In these embodiments, the first time slots that do not overlap with the second time slots may be used to transmit the sidelink acknowledgment message with a normal transmit power.

As a third possibility, in some embodiments it may be determined whether the sidelink data packet associated with the sidelink acknowledgment message (called the "first data packet") or the uplink transmission (called the "second data packet") has a higher priority. In these embodiments, the wireless device may transmit the higher priority message during the overlapping time slots. For example, based on a determination that the uplink transmission has the higher priority, the uplink transmission may be transmitted during a first subset of the first time slots that coincide with one or more of the second time slots, and the sidelink acknowledgment message may not be transmitted during the first subset of the first time slots. Alternatively, based on a determination that the sidelink data packet has the higher priority, the sidelink acknowledgment message may be transmitted over the uplink channel during the first subset of the first time slots, while the uplink transmission is not transmitted during the first subset of the first time slots.

In some embodiments, it may be determined that the sidelink data packet and the uplink transmission differ in priority by more than a predetermined threshold amount. Based on this determination, the first subset of the first time slots may be selected to include all of the first time slots that overlap with one or more of the second time slots. Alternatively, if the sidelink and uplink transmissions differ in priority by less than the threshold amount, or if they have the same priority, a subset of the overlapping time slots may be used for transmitting the sidelink data packet, while the remaining overlapping time slots are used for transmitting the uplink transmission.

For example, in some embodiments the first time slots include an aggregate plurality of time slots, where the first subset of the first time slots that overlap with the second time slots are a first portion of the aggregate plurality of time slots. When the first portion of the aggregate plurality of time slots are used to transmit the uplink transmission and not the sidelink acknowledgment message, a second portion of the aggregate plurality of time slots disjoint from the first portion may be used to transmit the sidelink acknowledgment message.

In some embodiments, the sidelink acknowledgment message is transmitted over at least two different frequency bands for two or more of the aggregate time slots. In some embodiments, the control information is received in a first frequency band, and the sidelink acknowledgment message is transmitted in both a second frequency band and a third frequency band during two different respective time slots, where the first frequency band is in between the second and third frequency band. The second and third frequency bands may be used for transmitting sidelink feedback, messaging for different time slots of the two or more aggregate time slots. Advantageously, the frequency diversity gain may be enhanced in these embodiments by increasing the difference in frequency between two of the frequency bands used for sidelink feedback messaging (e.g., compared to utilizing two adjacent frequency bands for sidelink feedback messaging).

In the following further exemplary embodiments are provided.

One set of embodiments may include an apparatus, comprising: a processor configured to cause a wireless device to perform any or all parts of the preceding examples.

A further exemplary embodiment may include a method, comprising: performing, by a wireless device, any or all parts of the preceding examples.

Another exemplary embodiment may include a device, comprising: an antenna; a radio coupled to the antenna; and a processor operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processor configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband processor configured to cause a wireless device to:
   receive first control information through a sidelink control channel, wherein the first control information specifies one or more first time slots for the wireless device to transmit a first acknowledgment message over a sidelink feedback channel, wherein the first acknowledgment message is related to a first data packet received by the wireless device;
   transmit second control information through the sidelink control channel, wherein the second control information specifies one or more second time slots for the wireless device to receive a second acknowledgment message over the sidelink feedback channel, wherein the second acknowledgment message is related to a second data packet transmitted by the wireless device;
   determine that one or more of the first time slots coincide with one or more of the second time slots;
   determine whether the first data packet or the second data packet has a higher priority; and
   based at least in part on a determination that the first data packet has the higher priority and further based at least in part on a determination that the first acknowledgment message is to be transmitted according to a short physical sidelink feedback channel (PSFCH) format:
   transmit the first acknowledgment message during a first subset of the first time slots that coincide with one or more of the second time slots, wherein the second acknowledgment message is not received during the first subset of the first time slots.

2. The baseband processor of claim 1, wherein the baseband processor is further configured to cause the wireless device to:
   based at least in part on a determination that the second data packet has the higher priority:
   receive the second acknowledgment message during the first subset of the first time slots, wherein the first acknowledgment message is not transmitted during the first subset of the first time slots.

3. The baseband processor of claim 2, wherein the baseband processor is further configured to cause the wireless device to:
   determine that the first acknowledgment message is to be transmitted according to a long PSFCH format; and
   determine that the second acknowledgment message is to be received according to the short PSFCH format,
   wherein said receiving the second acknowledgment message during the first subset of the first time slots is performed further based at least in part on the determination that the second acknowledgment message is to be received according to the short PSFCH format.

4. The baseband processor of claim 1, wherein the baseband processor is further configured to cause the wireless device to:
   determine that the first acknowledgment message is to be transmitted according to the short PSFCH format; and
   determine that the second acknowledgment message is to be received according to a long PSFCH format.

5. The baseband processor of claim 1,
   wherein the first time slots and the second time slots each comprise an aggregate plurality of time slots,
   wherein the first subset of the first time slots comprises a first portion of the aggregate plurality of time slots,
   wherein the baseband processor is further configured to cause the wireless device to:

receive the second acknowledgment message during a second portion of the aggregate plurality of time slots, wherein the second portion is disjoint from the first portion.

6. The baseband processor of claim 5, wherein the baseband processor is further configured to cause the wireless device to:
select the first portion to be larger than the second portion based at least in part on the determination that the first data packet has the higher priority.

7. The baseband processor of claim 5, wherein the baseband processor is further configured to cause the wireless device to:
determine that the first data packet is to be received before the second data packet is to be transmitted; and
based at least in part on the determination that the first data packet is to be received before the second data packet is to be transmitted, select the first portion of the aggregate plurality of time slots to occur before the second portion of the aggregate plurality of time slots.

8. The baseband processor of claim 5, wherein the baseband processor is further configured to cause the wireless device to:
determine that the first data packet is to be received after the second data packet is to be transmitted; and
based at least in part on the determination that the first data packet is to be received after the second data packet is to be transmitted, select the first portion of the aggregate plurality of time slots to occur after the second portion of the aggregate plurality of time slots.

9. The baseband processor of claim 1, wherein the baseband processor is further configured to cause the wireless device to:
determine that the first data packet and the second data packet differ in priority by more than a predetermined threshold amount,
based at least in part on the determination that the first data packet and the second data packet differ in priority by more than the predetermined threshold amount, select the first subset of the first time slots to include all of the first time slots.

10. The baseband processor of claim 1,
wherein the one or more first time slots comprise a plurality of aggregate time slots, and
wherein the first control information comprises a sidelink control information (SCI) stage 2 indication.

11. The baseband processor of claim 10, wherein the baseband processor is further configured to cause the wireless device to:
transmit transmitting the first acknowledgment message over at least two different frequency bands for two or more of the aggregate time slots.

12. The baseband processor of claim 10,
wherein the first control information is received in a first frequency band, wherein the baseband processor is further configured to cause the wireless device to:
transmit the first acknowledgment message in a second frequency band higher than the first frequency band during a first aggregate time slot of the plurality of aggregate time slots; and
transmit the first acknowledgment message in a third frequency band lower than the first frequency band during a second aggregate time slot of the plurality of aggregate time slots.

13. The baseband processor of claim 1,
wherein the one or more second time slots comprise a plurality of aggregate time slots, and wherein the second control information comprises a sidelink control information (SCI) stage 2 indication.

14. The baseband processor of claim 13, wherein the baseband processor is further configured to cause the wireless device to:
receive the first acknowledgment message in a different frequency band for two or more of the aggregate time slots.

15. The baseband processor of claim 14,
wherein the second control information is transmitted in a first frequency band, wherein the baseband processor is further configured to cause the wireless device to:
receive the second acknowledgment message in a second frequency band higher than the first frequency band during a first aggregate time slot of the plurality of aggregate time slots; and
receive the second acknowledgment message in a third frequency band lower than the first frequency band during a second aggregate time slot of the plurality of aggregate time slots.

16. A wireless device, comprising:
at least one antenna for performing wireless communications;
a radio coupled to the at least one antenna; and
a processor coupled to the radio;
wherein the wireless device is configured to:
receive first control information through a physical sidelink control channel (PSCCH), wherein the first control information specifies a first set of resources for the wireless device to transmit a first acknowledgment message over a physical sidelink feedback channel (PSFCH), wherein the first acknowledgment message is related to a first data packet;
transmit second control information through the PSCCH, wherein the second control information specifies a second set of resources for the wireless device to receive a second acknowledgment message over the PSFCH, wherein the second acknowledgment message is related to a second data packet;
determine that the first set of resources at least partially overlaps in time with the second set of resources;
determine which of the first data packet and the second data packet has a higher priority; and
based at least in part on a determination that the second data packet has the higher priority and further based at least in part on a determination that the first acknowledgment message is to be transmitted according to a short PSFCH format:
receive the second acknowledgment message during at least a first subset of the first set of resources, wherein the first subset overlaps in time with the second set of resources, wherein the first acknowledgment message is not transmitted during the first subset of the first set of resources.

17. The wireless device of claim 16, wherein the wireless device is further configured to:
based at least in part on a determination that the first data packet has the higher priority:
transmit the first acknowledgment message during the first subset of the first set of resources, wherein the second acknowledgment message is not received during the first subset of the first set of resources.

18. The wireless device of claim 16,
wherein the first set of resources and the second set of resources each comprise an aggregate plurality of time slots, wherein the first subset of the first set of resources comprises a first portion of the aggregate plurality of time slots,
wherein the processor is further configured to cause the wireless device to:
receive the second acknowledgment message during a second portion of the aggregate plurality of time slots, wherein the second portion is disjoint from the first portion; and
select the first portion to be larger than the second portion based at least in part on the determination that the first data packet has the higher priority.

19. A method performed by a wireless device, the method comprising:
receiving first control information through a sidelink control channel, wherein the first control information specifies one or more first time slots for the wireless device to transmit a first acknowledgment message over a sidelink feedback channel, wherein the first acknowledgment message is related to a first data packet received by the wireless device;
transmitting second control information through the sidelink control channel, wherein the second control information specifies one or more second time slots for the wireless device to receive a second acknowledgment message over the sidelink feedback channel, wherein the second acknowledgment message is related to a second data packet transmitted by the wireless device;
determining that one or more of the first time slots coincide with one or more of the second time slots;
determining that the first data packet has a higher priority than the second data packet; and
based at least in part on the determination that the first data packet has the higher priority than the second data packet and further based at least in part on a determination that the first acknowledgment message is to be transmitted according to a short physical sidelink feedback channel (PSFCH) format, transmitting the first acknowledgment message during a subset of the first time slots that coincide with one or more of the second time slots, wherein the second acknowledgment message is not received during the subset of the first time slots.

20. The method of claim 19, the method further comprising:
receiving third control information through the sidelink control channel, wherein the third control information specifies one or more third time slots for the wireless device to transmit a third acknowledgment message over a sidelink feedback channel, wherein the third acknowledgment message is related to a third data packet received by the wireless device;
transmitting fourth control information through the sidelink control channel, wherein the fourth control information specifies one or more fourth time slots for the wireless device to receive a fourth acknowledgment message over the sidelink feedback channel, wherein the fourth acknowledgment message is related to a fourth data packet transmitted by the wireless device;
determining that one or more of the third time slots coincide with one or more of the fourth time slots;
determining that the fourth data packet has a higher priority than the third data packet; and
receiving the fourth acknowledgment message during a subset of the third time slots that coincide with one or more of the fourth time slots, wherein the third acknowledgment message is not transmitted during the subset of the third time slots.

* * * * *

UNITED STATES PATENT AND TRADEMARK OFFICE
CERTIFICATE OF CORRECTION

PATENT NO. : 12,041,583 B2
APPLICATION NO. : 17/437125
DATED : July 16, 2024
INVENTOR(S) : Chunxuan Ye et al.

Page 1 of 1

It is certified that error appears in the above-identified patent and that said Letters Patent is hereby corrected as shown below:

In the Claims

Column 23, Line 50, delete "transmitting".

Signed and Sealed this
Twenty-ninth Day of April, 2025

Coke Morgan Stewart
*Acting Director of the United States Patent and Trademark Office*